United States Patent
Kondo et al.

(10) Patent No.: US 10,122,264 B2
(45) Date of Patent: Nov. 6, 2018

(54) CONTROL DEVICE AND PROGRAM PRODUCT FOR REDUCING A NOISE PEAK LEVEL

(71) Applicant: SHINDENGEN ELECTRIC MANUFACTURING CO., LTD., Tokyo (JP)

(72) Inventors: Takayuki Kondo, Tokyo (JP); Tomohiro Tanabe, Saitama (JP)

(73) Assignee: SHINDENGEN ELECTRIC MANUFACTURING CO., LTD., Tokyo (JP)

( * ) Notice: Subject to any disclaimer, the term of this patent is extended or adjusted under 35 U.S.C. 154(b) by 0 days.

(21) Appl. No.: 15/076,580

(22) Filed: Mar. 21, 2016

(65) Prior Publication Data

US 2017/0271980 A1    Sep. 21, 2017

(51) Int. Cl.
   *H02M 3/10*      (2006.01)
   *H02M 1/44*      (2007.01)
   *G05B 15/02*     (2006.01)

(52) U.S. Cl.
   CPC .............. *H02M 1/44* (2013.01); *G05B 15/02* (2013.01); *H02M 3/10* (2013.01)

(58) Field of Classification Search
   None
   See application file for complete search history.

(56) References Cited

U.S. PATENT DOCUMENTS

| | | | | |
|---|---|---|---|---|
| 6,292,507 B1* | 9/2001 | Hardin | ............ | H03L 7/0898 327/148 |
| 2005/0151571 A1* | 7/2005 | Brown | ............ | H02M 3/157 327/172 |
| 2007/0049202 A1 | 3/2007 | Kokuzawa | | |
| 2011/0012575 A1* | 1/2011 | Midya | ............ | H02M 1/44 323/282 |
| 2015/0200607 A1* | 7/2015 | Fujii | ............ | H02M 7/53871 363/97 |
| 2016/0067812 A1* | 3/2016 | Higgins | ............ | B23K 10/006 219/121.54 |
| 2016/0204702 A1* | 7/2016 | Padyana | ............ | H02M 1/15 323/271 |
| 2016/0227616 A1* | 8/2016 | Lee | ............ | H05B 33/0815 |
| 2016/0299622 A1* | 10/2016 | Sims | ............ | H02M 1/44 |

FOREIGN PATENT DOCUMENTS

| | | |
|---|---|---|
| JP | 2006-211479 A | 8/2006 |
| JP | 2007-035023 A | 2/2007 |
| JP | 2007-068266 A | 3/2007 |
| JP | 2010-279111 A | 12/2010 |

OTHER PUBLICATIONS

Japan Patent Office, Office Action for Japanese patent application No. 2014-075082, dated Jul. 4, 2017.
Japan Patent Office, Decision of non-entry of amendment for Japanese Patent Application No. 2014-075082, Jun. 26, 2018.

* cited by examiner

*Primary Examiner* — Jeffrey Gblende

(57) ABSTRACT

The control device includes a control signal supply unit, a frequency changing unit, and a storage unit. The control signal supply unit generates a control signal, and supplies the generated control signal to the switching element. The storage unit stores a frequency table defining a change value of a frequency of the control signal. The frequency changing unit changes the frequency of the control signal every time a predetermined time period elapses, according to the change value defined in the frequency table.

1 Claim, 4 Drawing Sheets

| INDEX NUMBER | CHANGE VALUE |
|---|---|
| 0 | $\Delta T0$ |
| 1 | $\Delta T1$ |
| 2 | $\Delta T2$ |
| 3 | $\Delta T3$ |
| 4 | $\Delta T4$ |
| 5 | $\Delta T5$ |
| . . . | . . . |
| n | $\Delta Tn$ |

FIG. 2

CONTROL DEVICE AND PROGRAM PRODUCT FOR REDUCING A NOISE PEAK LEVEL

BACKGROUND OF INVENTION

Field of the Invention

The present invention relates to a control device that controls a frequency of a control signal for controlling on and off of a switching element, and a program for such a control device.

Description of Related Art

Conventionally, turning on and off a switching element often produces noises. Thus, enhancement of a filter is known as one method of reducing a noise peak level due to turning on and off of the switching element.

However, this method increases manufacturing costs and a number of components. Therefore, there is proposed a technique of reducing a noise peak level by changing a switching frequency of a switching power supply in an electronic device having a switching power supply to distribute a noise energy due to turning on and off a switching element (e.g., PTL 1).

CITATION LIST

Patent Literatures

PTL 1: Japanese Unexamined Patent Application Publication No. 2007-68266

According to the technique described in PTL 1, when a frequency of an integral multiple of the switching frequency of the switching power supply is within a received frequency domain of AM radio broadcast signals, a load is applied to the switching power supply to change the switching frequency. Accordingly, in order to change the switching frequency, it is necessary to sense the received frequency domain of the AM radio broadcast signal, and to determine whether or not a frequency of an integral multiple of the switching frequency is within the received frequency domain. Therefore, it is not possible to sufficiently suppress an increase in manufacturing costs and a number of components.

In view of the above issues, an object of the present invention is to reduce a noise peak level due to turning on and off of a switching element, while suppressing an increase in manufacturing costs and a number of components.

SUMMARY OF INVENTION

One or more embodiments of the invention provide below items in order to solve the above described issues.

Embodiment (1)

One or more embodiments of the invention provide a control device (corresponding to a control device 1 in FIG. 1, for example) that controls a frequency of a control signal for controlling on and off of a switching element (corresponding to a switching element 100 in FIG. 1, for example), the control device including: a storage unit (corresponding to a storage unit 30 in FIG. 1, for example) configured to store a frequency table defining a change value for a frequency of the control signal; and a frequency changing unit (corresponding to a frequency changing unit 20 in FIG. 1, for example) configured to change the frequency of the control signal, every time a predetermined time period elapses, according to the change value defined in the frequency table.

According to Embodiment (1), the frequency changing unit is caused to change the frequency of the control signal every time a predetermined time period elapses. Accordingly, it is possible to prevent a noise energy from concentrating on a particular frequency by distributing a noise energy due to turning on and off of the switching element. Therefore, a noise peak level due to turning on and off of the switching element may be reduced without enhancing a filter, or without sensing a frequency domain of a signal affected by a noise due to turning on and off of the switching element (for example, the AM radio broadcast signal described above). Thus, it is possible to reduce the noise peak level due to turning on and off of the switching element, while suppressing an increase in manufacturing costs and a number of components.

Further, according to Embodiment (1), the frequency of the control signal is changed based on the frequency table stored in the storage unit. Accordingly, the change in the frequency of the control signal may be controlled minutely based on the frequency table. Therefore, it is possible to distribute a noise energy due to turning on and off of the switching element more effectively, and thus to further reduce a noise peak level due to turning on and off of the switching element.

Moreover, according to Embodiment (1), the frequency of the control signal is changed based on the frequency table stored in the storage unit. Accordingly, by preparing frequency tables corresponding to environments and control signals of the switching element, the frequency of the control signal may be changed appropriately according to an environment or a control signal of the switching element. Therefore, applications to various types of devices and apparatuses may be conceivable.

Embodiment (2)

One or more embodiments of the invention provide the control device of Embodiment (1) is configured such that the frequency changing unit performs an operation to the frequency of the control signal based on the change value defined in the frequency table, and changes the frequency of the control signal to a result of the operation.

According to Embodiment (2), the control device of Embodiment (1) is configured such that the frequency changing unit is caused to perform the operation based on the change value defined in the frequency table for the frequency of the control signal, and changes the frequency of the control signal to a result of the operation. Accordingly, as the frequency of the control signal may be changed based on a so-called digital processing, it is possible to control the change of the frequency of the control signal in a highly minute manner. Therefore, a noise peak level due to turning on and off of the switching element may be reduced more appropriately.

Embodiment (3)

One or more embodiments of the invention provide the control device of Embodiment (1) is configured such that the frequency changing unit performs, to the frequency of the control signal, one of addition and subtraction of the change value defined in the frequency table, and changes the frequency of the control signal to a result of either the addition or the subtraction.

According to Embodiment (3), the control device of Embodiment (1) is configured such that the frequency changing unit is caused to perform, to the frequency of the control signal, one of the addition and the subtraction of the change value defined in the frequency table, and to change the frequency of the control signal to the result of either the addition or the subtraction. Therefore, as the frequency of the control signal may be changed based on a simple operation, it is possible to reduce a noise peak level due to turning on and off of the switching element, while reducing processing load.

Embodiment (4)

One or more embodiments of the invention provide the control device of Embodiment (3) is configured such that the frequency changing unit performs one of: changing of the frequency of the control signal to a predetermined upper limit, when a value obtained by adding the change value defined in the frequency table to the frequency of the control signal is greater than the upper limit, and changing of the frequency of the control signal to a predetermined lower limit, when a value obtained by subtracting the change value defined in the frequency table from the frequency of the control signal is smaller than the lower limit.

Here, the control device of Embodiment (3) has possibilities that overflow occurs when the change value defined in the frequency table is added to the frequency of the control signal, and that underflow occurs when the change value defined in the frequency table is subtracted from the frequency of the control signal. Therefore, according to Embodiment (4), the control device of Embodiment (3) causes the frequency changing unit one of the following two procedures. Firstly, when a value obtained by adding the change value defined in the frequency table to the frequency of the control signal is greater than an upper limit, the frequency of the control signal is changed to the upper limit. Secondly, when a value obtained by subtracting the change value defined in the frequency table from the frequency of the control signal is smaller than a lower limit, changing of the frequency of the control signal is changed to the lower limit. With this, it is possible to prevent overflow or underflow from occurring in the operation by the frequency changing unit.

Embodiment (5)

One or more embodiments of the invention provide the control device of Embodiment (1) is configured such that the frequency changing unit changes the frequency of the control signal using spread spectrum.

According to Embodiment (5), the control device of Embodiment (1) causes the frequency changing unit to change the frequency of the control signal using spread spectrum. Therefore, it is possible to reduce a noise peak level due to turning on and off of the switching element.

Embodiment (6)

One or more embodiments of the invention provide a program product including a non-transitory computer readable medium storing a program which, when executed by a computer, causes the computer to perform a control method of controlling a frequency of a control signal for controlling on and off of a switching element, the method including: changing a frequency of the control signal, every time a predetermined time period elapses, according to a change value defined in a frequency table.

According to Embodiment (6), by executing the program using a computer, the frequency of the control signal is changed according to the change value defined in frequency table every time a predetermined time period elapses. Therefore, it is possible to provide the same effects as those described above.

According to one or more embodiments of the present invention, it is possible to reduce a noise peak level due to turning on and off of a switching element, while suppressing an increase in manufacturing costs and a number of components.

BRIEF DESCRIPTION OF THE DRAWINGS

FIG. 2 is a frequency table used by the control device according to one or more embodiments of the present invention.

DETAILED DESCRIPTION

Hereinafter, embodiments of the present invention will be described in detail with reference to the drawings. It should be noted that components in this embodiment may be replaced by existing components as appropriate, and variations including combinations with other existing components may also be conceivable. Therefore, the description of this embodiment may not limit the scope of the invention defined by the claims.

Figure 1:
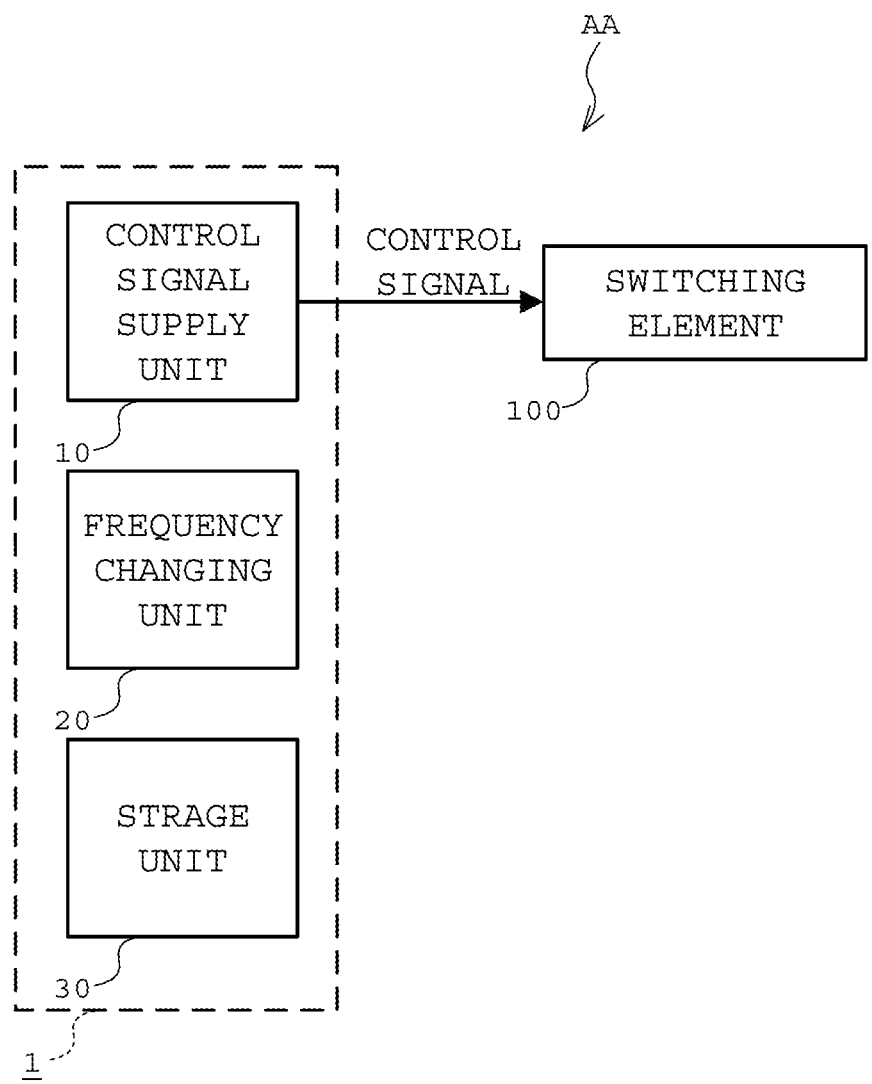
FIG. 1 is a block diagram of a driving device having a control device according to one or more embodiments of the present invention.

FIG. 1 is a block diagram of a driving device AA having a control device 1 according to one or more embodiments of the present invention. The driving device AA also includes a switching element 100, in addition to the control device 1.

The control device 1 supplies a control signal to the switching element 100, and controls on and off of the switching element 100. The control device 1 includes a control signal supply unit 10, a frequency changing unit 20, and a storage unit 30.

The control signal supply unit 10 generates a control signal, and supplies the generated control signal to the switching element 100. The control signal supply unit 10 also changes a frequency of the generated control signal according to a frequency control signal that will be described later and transmitted from the frequency changing unit 20.

The storage unit 30 stores a frequency table that has been previously set. The frequency table defines change values of the frequency of the control signal.

FIG. 2 shows a frequency table stored in the storage unit 30. The frequency table defines an index number i (i is an arbitrary integer satisfying a relation of $0 \leq i \leq n$; n represents a number of elements of the frequency table, and is an integer satisfying a relation of $n \geq 1$) and a change value $\Delta T_i$ on a one-on-one basis. Here, the change value $\Delta T_i$ is not limited to a positive value, and may be a negative value or zero.

Referring back to FIG. 1, the frequency changing unit 20 changes the frequency of the control signal every time a predetermined time period elapses according to the change value ΔTi defined in the frequency table. The frequency changing unit 20 is configured by a microcomputer such as an MCU (Micro Controller Unit) or an MPU (Micro Processing Unit), and realizes a process described below by executing a program stored in a non-transitory computer readable medium. Examples of the non-transitory computer readable medium that may be used include a ROM (Read Only Memory) provided for a microcomputer, a non-volatile memory such as an EPROM or a flash memory, a magnetic disk such as a hard disk, and a CD-ROM.

Figure 3:
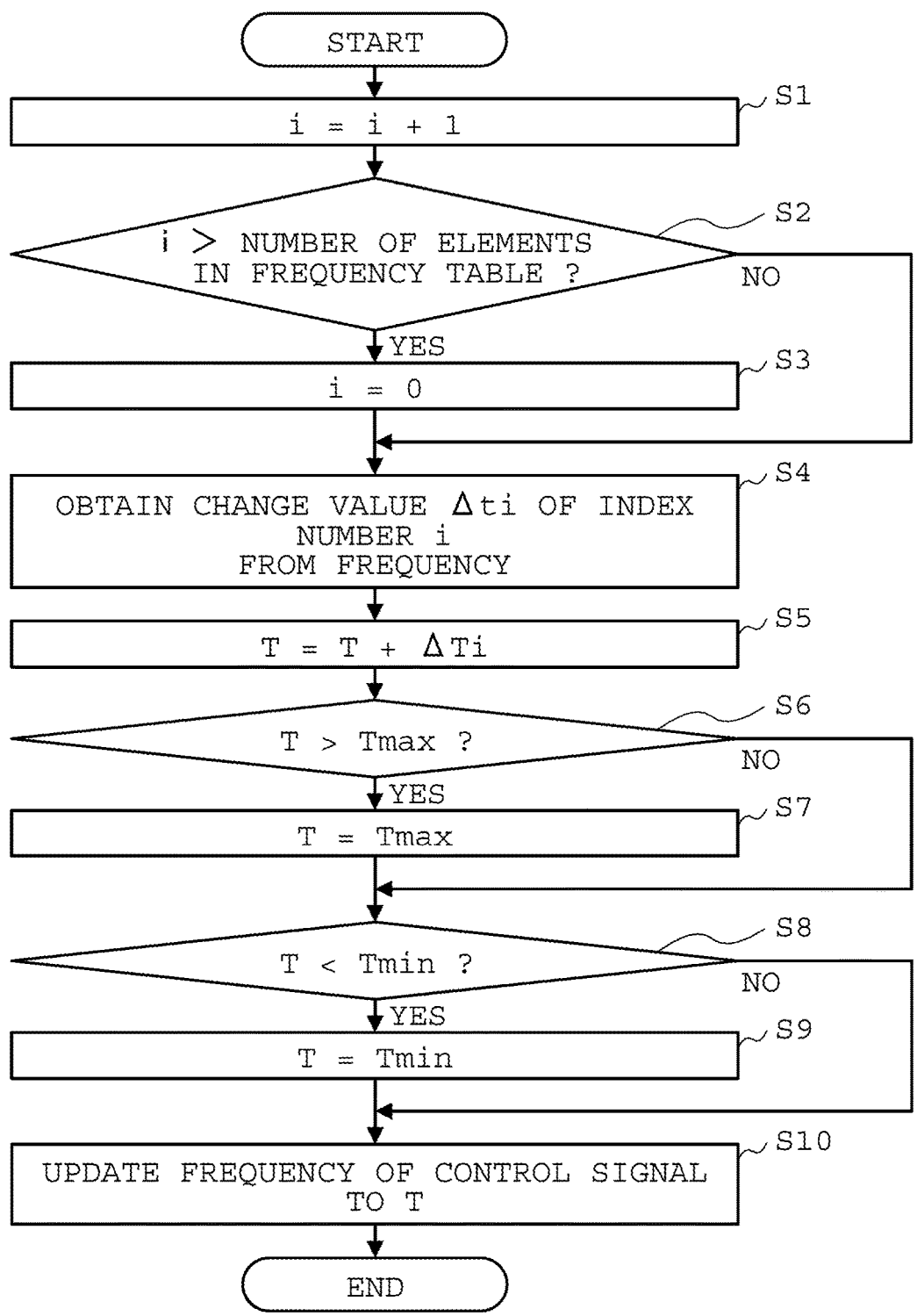
FIG. 3 is a flowchart for a frequency changing process performed by the control device according to one or more embodiments of the present invention.

FIG. 3 is a flowchart for a frequency changing process performed by the frequency changing unit 20. The frequency changing process shown in FIG. 3 is performed by the frequency changing unit 20 every time a predetermined time period elapses.

In Step S1, the frequency changing unit 20 adds "1" to the index number i, and moves the process to Step S2.

In Step S2, the frequency changing unit 20 determines whether or not the index number i is greater than the number of elements n of the frequency table. If the index number i is determined to be greater than the number of elements n of the frequency table, the process is moved to Step S3. If the index number i is determined to be no greater than the number of elements n of the frequency table, the process is moved to Step S4.

In Step S3, the frequency changing unit 20 initializes the index number i to "0", and moves the process to Step S4.

In Step S4, the frequency changing unit 20 reads the change value ΔTi corresponding to the index number i from the frequency table, and moves the process to Step S5.

In Step S5, the frequency changing unit 20 adds the change value ΔTi that has been read in Step S4 to a frequency T, and moves the process to Step S6. In this step, a so-called summation operation is performed if the change value ΔTi is a positive value, and a so-called subtraction operation is performed if the change value ΔTi is a negative value.

Further, the frequency T may be a predetermined value, or a value equal to a frequency of the control signal that has been generated by the control signal supply unit 10. If the frequency T takes a predetermined value, the frequency T shall be recorded in the frequency changing unit 20. If the frequency T takes a value equal to a frequency of the control signal generated by the control signal supply unit 10, the frequency of the control signal generated by the control signal supply unit 10 shall be sequentially transmitted from the control signal supply unit 10 to the frequency changing unit 20.

In Step S6, the frequency changing unit 20 determines whether or not a result of the operation in Step S5 is greater than a predetermined maximum frequency Tmax. If the result of the operation in Step S5 is determined to be greater than the maximum frequency Tmax, the process is moved to Step S7. If the result of the operation in Step S5 is determined to be no greater than the maximum frequency Tmax, the process is moved to Step S8.

In Step S7, the frequency changing unit 20 takes the frequency T as the maximum frequency Tmax, and moves the process to Step S8.

In Step S8, the frequency changing unit 20 determines whether or not the result of the operation in Step S5 is smaller than a predetermined minimum frequency Tmin. If the result of the operation in Step S5 is determined to be smaller than the minimum frequency Tmin, the process is moved to Step S9. If the result of the operation in Step S5 is determined to be no smaller than the minimum frequency Tmin, the process is moved to Step S10.

In Step S10, the frequency changing unit 20 transmits a signal indicating the frequency T obtained in one of Steps S5, S7, and S9, as a frequency control signal described above, to the control signal supply unit 10, and terminates the frequency changing process shown in FIG. 3. With this, the control signal supply unit 10 generates a control signal for the frequency T obtained in one of Steps S5, S7, and S9.

Figure 4:
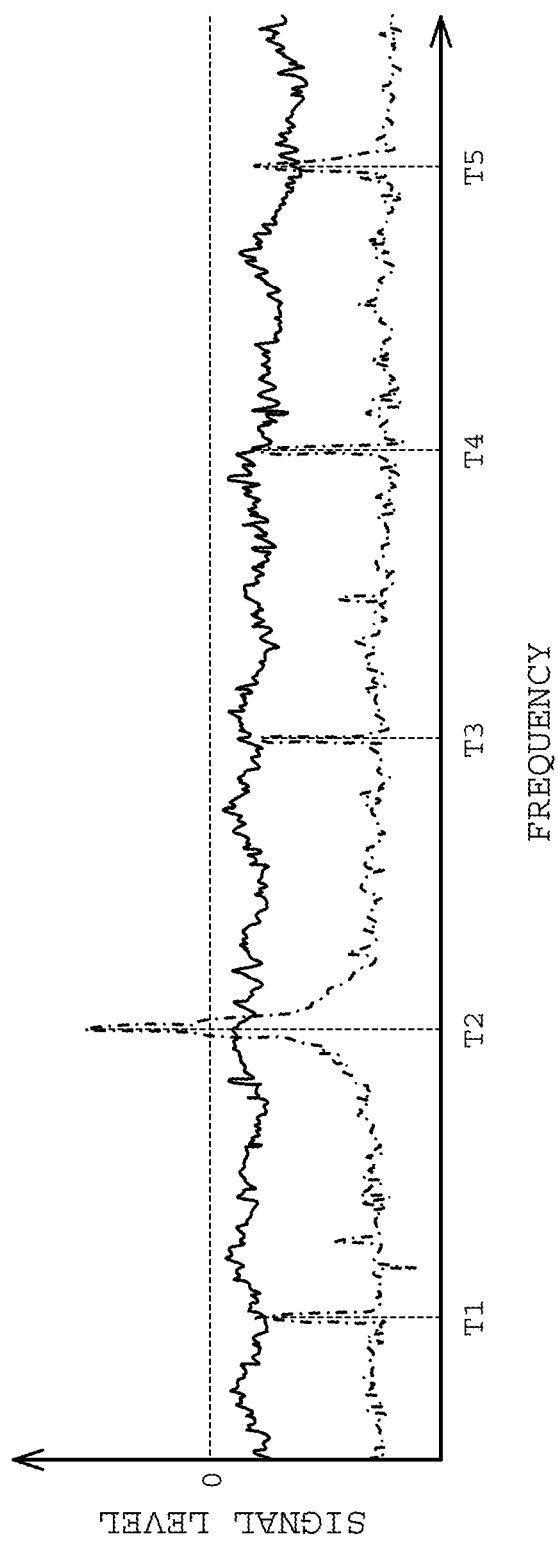
FIG. 4 is a chart showing a noise peak level of a switching element.

FIG. 4 is a chart showing a noise peak level of the switching element 100. In FIG. 4, a vertical axis indicates a noise level of the switching element 100, and a horizontal axis indicates a switching frequency of the switching element 100. Further, a waveform in a solid line represents a waveform of noises of the switching element 100 when the frequency changing process shown in FIG. 3 is performed, and a waveform in an alternate long and short dash line represents a waveform of noises of the switching element 100 when the frequency changing process shown in FIG. 3 is not performed.

Referring to FIG. 4, a noise energy that is concentrated on frequencies T1, T2, T3, T4, and T5 may be distributed by performing the frequency changing process shown in FIG. 3.

According to the control device 1, effects described below may be provided.

The control device 1 causes the frequency changing unit 20 to change the frequency of the control signal every time a predetermined time period elapses. Accordingly, it is possible to prevent a noise energy from concentrating on a particular frequency by distributing a noise energy due to turning on and off of the switching element 100. Therefore, a noise peak level due to turning on and off of the switching element 100 may be reduced without enhancing a filter, or without sensing a frequency domain of a signal affected by a noise due to turning on and off of the switching element 100. Thus, it is possible to reduce the noise peak level due to turning on and off of the switching element 100, while suppressing an increase in manufacturing costs and a number of components.

Further, the control device 1 changes the frequency of the control signal based on the frequency table stored in the storage unit 30. Accordingly, the change in the frequency of the control signal may be controlled based on the frequency table, minutely to a minimum value that can be handled by a microcomputer constituting the frequency changing unit 20. Therefore, it is possible to distribute a noise energy due to turning on and off of the switching element 100 more effectively, and thus to further reduce a noise peak level due to turning on and off of the switching element 100.

Moreover, the control device 1 changes the frequency of the control signal based on the frequency table stored in the storage unit 30. Accordingly, by preparing frequency tables corresponding to environments and control signals of the switching element 100, the frequency of the control signal may be changed appropriately according to an environment or a control signal of the switching element 100. Therefore, applications to various types of devices and apparatuses may be conceivable.

Furthermore, the control device 1 causes the frequency changing unit 20 to perform an operation based on the change value ΔTi defined in the frequency table for the frequency of the control signal, and changes the frequency of the control signal to a result of the operation. Accordingly, as the frequency of the control signal may be changed based on a so-called digital processing, it is possible to control the change of the frequency of the control signal in a highly minute manner. Therefore, a noise peak level due to turning on and off of the switching element 100 may be reduced more appropriately.

Further, the control device 1 causes the frequency changing unit 20 to perform either a summation operation or a subtraction operation according to the change value ΔTi defined in the frequency table for the frequency T, and changes the frequency of the control signal to a result of this operation. Therefore, as the frequency of the control signal may be changed based on a simple operation, it is possible to reduce a noise peak level due to turning on and off of the switching element 100, while reducing processing load.

Moreover, the control device 1 limits an upper limit of the frequency of the control signal to the maximum frequency Tmax in Steps S6 and S7. Therefore, it is possible to prevent overflow from occurring in the operation by the frequency changing unit 20.

Furthermore, the control device 1 limits a lower limit of the frequency of the control signal to the minimum frequency Tmin in Step S8 and S9. Therefore, it is possible to prevent underflow from occurring in the operation by the frequency changing unit 20.

The present invention may not be limited to the above embodiment, and may be modified and implemented in various manners without departing from the scope of the invention.

For example, the change value ΔTi read in Step S4 is added to the frequency T in Step S5 in the above embodiment, but the present invention is not limited to such an example, and the change value ΔTi may be subtracted from the frequency T, or the frequency T may be multiplied by the change value ΔTi.

REFERENCE SIGNS LIST

AA: Driving Device
1: Control Device
10: Control Signal Supply Unit
20: Frequency Changing Unit
30: Storage Unit
100: Switching Element

What is claimed is:

1. A control device that controls a frequency of a control signal for controlling on and off of a switching element, the control device comprising:
  a storage unit configured to store a frequency table defining a change value for a frequency of the control signal; and
  a frequency changing unit configured to change the frequency of the control signal, independent of an input voltage, every time a predetermined time period elapses, according to the change value defined in the frequency table,
  wherein the frequency changing unit changes the frequency of the control signal according to the change value defined in the frequency table, and
  wherein the frequency changing unit performs one of:
  changing of the frequency of the control signal to a predetermined upper limit, when a value obtained by adding the change value defined in the frequency table to the frequency of the control signal is greater than the upper limit, and
  changing of the frequency of the control signal to a predetermined lower limit, when a value obtained by subtracting the change value defined in the frequency table from the frequency of the control signal is smaller than the lower limit.

* * * * *